United States Patent [19]

Conway et al.

[11] 4,080,287

[45] Mar. 21, 1978

[54] ACTIVATED CARBON TREATMENT OF OXYGENATED WASTEWATER

[75] Inventors: Richard Ashley Conway, Charleston; Cyron Tanner Lawson, South Charleston, both of Va.; Michael Joseph Stankewich, Jr., East Amherst, N.Y.

[73] Assignee: Union Carbide Corporation, New York, N.Y.

[21] Appl. No.: 734,105

[22] Filed: Oct. 20, 1976

[51] Int. Cl.² ........................... C02C 5/02; C02C 5/10
[52] U.S. Cl. ........................................... 210/7; 210/8; 210/17; 210/27; 210/40; 210/96 R; 210/150; 210/195 S; 210/202; 210/218
[58] Field of Search ................... 210/7, 15, 17, 18, 40, 210/63 R, 101, 195 S, 199, 202, 205, 218, 8, 20, 27, 150, 96 R, 197, 294

[56] References Cited

U.S. PATENT DOCUMENTS

| | | | |
|---|---|---|---|
| 3,244,621 | 4/1966 | Bouthilet | 210/40 |
| 3,510,265 | 5/1970 | Kawahata | 210/32 |
| 3,547,815 | 12/1970 | McWhirter | 210/7 |
| 3,558,255 | 1/1971 | Rose | 210/101 |
| 3,660,277 | 5/1972 | McWhirter et al. | 210/15 |
| 3,670,887 | 6/1972 | McWhirter | 210/15 |
| 3,803,029 | 4/1974 | Blecharczyk | 210/17 |
| 3,855,120 | 12/1974 | Garbo | 210/17 |
| 3,872,003 | 3/1975 | Walker | 210/96 R |
| 3,904,518 | 9/1975 | Hurton et al. | 210/17 |
| 3,907,673 | 9/1975 | Belk et al. | 210/17 |
| 4,009,098 | 2/1977 | Jeris | 210/17 |

FOREIGN PATENT DOCUMENTS 1,439,401   6/1976   United Kingdom.

OTHER PUBLICATIONS

"Biologically-Extended Physicochemical Treatment" Advances in Water Pollution Research, Proceedings of the Sixth International Conference Held in Jerusalem, Jun. 18-23, 1972, Pergammon Press, pp. 641-649.
"Nitrification with Submerged Filters", Journal WPCF, vol. 44, No. 11, Nov. 1972, pp. 2086-2102.

Primary Examiner—Charles N. Hart
Assistant Examiner—Ivars Cintins
Attorney, Agent, or Firm—Steven J. Hultquist

[57] ABSTRACT

An integrated system for treating wastewater containing biodegradeable organic contaminants by oxygenation thereof in the presence of activated sludge in an enclosed oxygenation zone with at least 50% oxygen feed gas and removal of the residual organic contaminants by adsorption in an activated carbon adsorption zone. At least part of the oxygen-depleted vent gas discharged from the oxygenation zone is concurrently flowed upwardly through the adsorption zone with the oxygenated effluent to maintain aerobic biological conditions in the adsorption zone for physical adsorption and biochemical oxidization of the residual organic contaminants therein.

21 Claims, 3 Drawing Figures

ACTIVATED CARBON TREATMENT OF OXYGENATED WASTEWATER

BACKGROUND OF THE INVENTION

1. Field of the Invention

This invention relates generally to a system for treating wastewater containing biodegradeable organic contaminants by oxygenation in contact with active biomass followed by contacting with an activated carbon zone for removal of residual organic contaminants.

2. Description of the Prior Art

A common method for treating wastewater such as municipal sewage or industrial effluents to remove biodegradeable organic contaminants is by the activated sludge process. According to this process, the sewage with or without primary clarification is thoroughly mixed with oxygen-containing gas in the presence of aerobic microorganisms in the activated sludge. The organic matter contained in the water is thereby absorbed and biochemically oxidized by the activated sludge microorganisms. Subsequently the activated sludge is separated, e.g., by gravity settling, and the purified effluent is discharged into a receiving stream or body of water.

While the activated sludge process is one of the most effective and economic wastewater treatment processes available today, it does not achieve complete purification. The effluent, as for example from a municipal activated sludge treatment plant, will contain some oxidizable material including biodegradeable organic matter representing residual biochemical oxygen demand (BOD).

Until comparatively recently, atmospheric air has been employed as the sole source of oxygen in activated sludge plants. In recent years however, this system has been vastly improved by the use of high purity oxygen gas as the oxidant in the manner taught by U.S. Pat. Nos. 3,547,812 to 3,547,815, to J. R. McWhirter et al. In the practice of oxygenation of wastewater as taught by the McWhirter et al. patents, at least one enclosed covered oxygenation chamber is employed wherein the liquid undergoing treatment is intimately contacted in the presence of activated sludge with oxygen-enriched gas from an over-lying gas space to dissolve the oxygen necessary for aerobic biological activity. Such oxygenation systems provide substantial advantages over prior art treatment systems wherein atmospheric air is used as the oxidant in open aeration chambers. For example, the closed chamber oxygenation system is able to operate at biological suspended solids levels several times greater and aeration detention periods several times less than those of air aeration systems while maintaining comparable or better overall levels of treatment. Such advantages are a consequence of the higher mass transfer driving force for oxygen-enriched gas relative to air, which permits higher dissolved oxygen levels to be achieved with economic levels of volumetric oxygen transfer rate per unit of power input. In spite of these advantages however, closed chamber oxygenation systems still produce effluents which contain some small quantity of residual biodegradeable contaminants.

It is known in the art to "polish" or post-treat the effluent from the activated sludge secondary treatment system by contacting the effluent with activated carbon to provide for removal of the residual organic contaminants in the wastewater. Such tertiary treatment has in fact proven effective in providing high overall adsorptive removals of total organic carbon (TOC) and the consistuent biochemical oxygen demand (BOD) from the wastewater due to the morphology of activated carbon which provides an extremely large surface area for physical absorption, e.g., 1200 to 1400 meters$^2$ per gram of activated carbon.

Recent studies have shown that the absorptive capability of activated carbon for organic contaminants of wastewater can be enhanced by the promotion of aerobic conditions in expanded beds of activated carbon in which biological growth is allowed to develop on the activated carbon surfaces. In a paper by Weber, W. J., Jr., Friedman, L. D., and Blum, R., Jr., entitled "Biologically Extended Physical Chemical Treatment", presented at the Sixth International Conference on Water Pollution Research, Jerusaleum, in 1972, it was reported that an expanded bed activated carbon adsorption system operated under aerobic conditions and treating clarified primary effluent wastewater comprised of approximately 75% domestic waste and 25% industrial waste with a total organic carbon (TOC) concentration in the range of 10–40 milligrams per liter had demonstrated better performance (approximately 15% higher TOC removal) than a corresponding anaerobic activated carbon system operated under the same conditions and had demonstrated a removal capability of nearly 70% by weight adsorption of organic material during nine months of continuous treatment. This performance was markedly superior to that predicted by saturation data obtained from measurements of absorption isotherms and suggested that the observed enchancement of the effective capacity could be attributed to bacteriological activity on the surfaces of the carbon substrate. Subsequent work in the field has borne out the existence of this mechanism as providing an in situ reactivation of the activated carbon adsorbent by biological assimilation of surface absorbed biodegradeable contaminants thereby providing a longer operating life for the adsorbent before saturation occurs and regeneration as for example by thermal reactivation is necessary.

It is an object of the present invention to provide an improved system for treating wastewater containing biodegradeable organic contaminants by oxygenation followed by contacting with an activated carbon zone utilizing the above-described mechanism.

Another object is to provide a system of the above type which is characterized by high oxygen utilization and low power consumption.

Other objects and advantages of this invention will be apparent from the ensuing disclosure and appended claims.

SUMMARY OF THE INVENTION

This invention relates generally to a system for treating wastewater containing biodegradeable organic contaminants by oxygenation followed by contacting with activated carbon for removal of residual organic contaminants.

More specifically, the method aspect of the invention relates to treatment of wastewater containing biodegradeable organic contaminants by oxygenation in contact with the active biomass including the steps of mixing the wastewater with activated sludge and feed gas containing at least 50% oxygen by volume in an enclosed oxygenation zone for sufficient duration to biochemically oxidize carbon food in the wastewater and form oxygenated liquor of reduced BOD content.

Oxygen-depleted vent gas containing 20–70% oxygen by volume and the oxygenated liquor are discharged from the oxygenation zone. The oxygenated liquor is separated into effluent containing residual biodegradeable organic contaminants and sludge, and at least part of the sludge is recycled to the oxygenation zone as the aforementioned activated sludge therefor.

The improvement in the method aspect of the invention resides in removing the residual organic contaminants from the effluent by cocurrently flowing the effluent and at least part of the vent gas from the oxygenation zone upwardly through an activated carbon adsorption zone. The vent gas is introduced to the adsorption zone at a rate sufficient to maintain aerobic biological conditions in the adsorption bed and maintain a dissolved oxygen concentration of at least 2 parts per million (p.p.m.) in the effluent being flowed therethrough for physical adsorption and biochemical oxidization of the residual organic contaminants in the adsorption zone. Organic contaminant-depleted effluent water and oxygen-depleted waste gas are discharged from the absorption zone.

The apparatus aspect of the invention relates to a system for treating wastewater containing biodegradeable organic contaminants by oxygenation in contact with active biomass including an enclosed oxygenation vessel with means for introducing wastewater and activated sludge to the oxygenation vessel and conduit means for introducing at least 50% oxygen by volume feed gas at superatmospheric pressure to the vessel. Gas-liquid contacting means are positioned within the vessel for mixing of the wastewater, activated sludge and oxygen-containing gas therein to form oxygenated liquor. Gas vent means are provided for discharging oxygen-depleted vent gas from the vessel. Passage means are included for transferring oxygenated liquor from the oxygenation vessel to means for separating the oxygenated liquor into effluent containing residual biodegradeable organic contaminants and activated sludge. The apparatus also includes means for recycling the separated sludge from the separating means to the means for introducing activated sludge to the oxygenation vessel, and means for discharging effluent containing residual biodegradeable organic contaminants from the separating means.

The improvement in the apparatus aspect of the invention relates to means for removing the residual organic components from the effluent. Such means comprise an adsorbent vessel with enclosing side and bottom walls containing a bed of particulate activated carbon adsorbent bearing against the side walls thereof. The bed is supported within the adsorbent vessel at its lower end and unconfined at its upper end. Means joined to the gas vent means are provided for introducing the oxygen-depleted vent gas discharged from the oxygenation vessel into the adsorbent vessel at its lower end, with means joined to the effluent discharge means for introducing the effluent containing residual biodegradeable organic contaminants into the adsorbent vessel at its lower end. Further means are provided for discharging oxygen-depleted waste gas and final effluent water from the adsorbent vessel at its upper end, to provide cocurrent upward flow of the introduced oxygen-depleted vent gas and effluent through the adsorbent bed and maintain aerobic biological conditions therein for physical adsorption and biochemical oxidization of the residual organic contaminants in the effluent flowed therethrough.

In a particularly preferred aspect, the method and apparatus of the invention are suitably employed to treat wastewater containing biodegradeable organic contaminants by activated sludge in oxygenation wastewater treatment systems of the type as described hereinearlier and disclosed and claimed in McWhirter et al. U.S. Pat. Nos. 3,547,812 to 3,547,815, incorporated herein to the extent pertinent. As used herein the term "aerobic conditions" means that viable aerobic microorganisms — i.e., living aerobic species capable of biologically assimilating organic contaminants and dissolved oxygen to yield energy for respiration and cellular growth — are present on the surfaces of the activated carbon adsorbent in the absorption zone. Such conditions are readily determinable as for example by oxygen uptake and respiration measurements performed on the adsorption zone, as described hereinafter.

Operation in accordance with the present invention has been found to provide substantial enhancement of the removal capability of the wastewater treatment system by virtue of the fact of in situ reactivation of the activated carbon adsorbent, by biological renewal of the adsorbent active surfaces. The invention permits increased adsorption bed life to be achieved with increased residual organic contaminant removal as compared to straight adsorption and accomplishes these improvements more economically than would be the case if pure oxygen or air were employed to maintain aerobic conditions in the adsorption zone. In long term adsorption zone operation the oxygenation zone vent gas has been found to be superior to air and, unexpectedly, generally equivalent to pure oxygen in achieving extended adsorbent bed life — i.e., the period during which the adsorbent bed is able to actively remove the residual organic contaminants from the activated sludge-treated effluent. Particular advantage has been found in the application of the invention to removal of acidic organic contaminants from wastewater, due to the carbon dioxide content of the oxygenation zone vent gas and the pH characteristics of the oxygenated effluent introduced to the adsorption zone.

In summary the oxygenation zone vent gas has been found to be generally competitive with pure oxygen as an aeration medium for the adsorption zone from a performance standpoint (both are superior to air) and to be superior to pure oxygen from an economy standpoint. The present invention allows the further benefit, not available from separate use of air or pure oxygen, of operating the oxygenation activated sludge system at an increased oxygen feed rate thereby permitting a reduction in the oxygen dissolution power requirements for the oxygenation zone.

DESRCIPTION OF THE PREFERRED EMBODIMENTS

Figure 1:
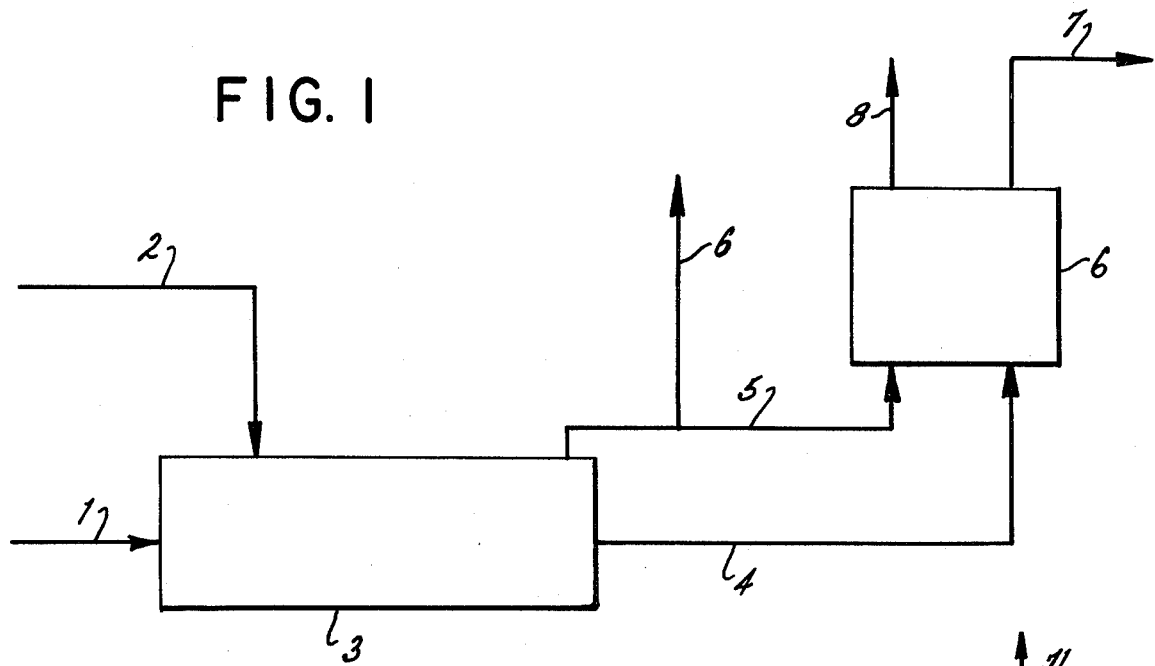
FIG. 1 is a schematic block diagram for a wastewater treatment system according to the present invention.

Referring now to the drawings, FIG. 1 shows a generalized schematic block diagram of a wastewater treatment system according to the invention. Influent BOD-containing wastewater, as for example sewage or industrial wastewater, enters the activated sludge secondary treatment system 3 in line 1. This influent wastewater may be subjected to primary treatment, upstream of the activated sludge secondary treatment, by chemical treatment, primary sedimentation or other well-known primary treatment steps. Feed gas containing at least 50% oxygen by volume is introduced to the activated sludge treatment zone in conduit 2.

In the secondary treatment zone, the introduced feed gas and wastewater are mixed with activated sludge in an enclosed oxygenation zone. The enclosed oxygenation zone may be any of various commonly employed types, such as a contacting pipe through which wastewater, oxygen gas and activated sludge are passed under turbulent flow conditions to achieve the requisite mixing. Alternatively, the oxygenation zone may be of a type as disclosed in the aforementioned McWhirter et al. U.S. Pat. Nos. 3,547,812 to 3,547,815, incorporated herein to the extent pertinent. Furthermore, the specific activated sludge process employed may be of various types including for example contact stabilization and extended aeration. Regardless of the specific activated sludge process employed, however, the wastewater, activated sludge and oxygen-containing gas are intimately mixed in the enclosed aeration zone for sufficient duration to biochemcially oxidize carbon food in the wastewater and form oxygenated liquor of reduced BOD content.

After the requisite period of BOD conversion is completed, the resultant oxygenated liquor is discharged from the oxygenation zone and separated into activated sludge and purified effluent containing some residual biodegradeable organic contaminants. At least part of the separated activated sludge is recirculated to the oxygenation zone to maintain effective biological action on the influent wastewater. The separated purified effluent is discharged from the activated sludge secondary treatment system in line 4.

During the oxygenation mixing treatment, oxygen from the feed gas is dissolved in the liquid undergoing treatment and utilized by the biomass — i.e., sludge microorganisms — for biological assimilation of the carbonaceous food in the wastewater. Carbon dioxide is formed as a product of the oxidation process and evolves into the gas phase, together with nitrogen, argon and other gases which are dissolved in the influent wastewater and stripped from the liquid phase during oxygenation. As a result the oxygen purity of the introduced oxygen feed gas declines during the oxygenation process and an oxygen-depleted gas, containing for example 50% oxygen, 30% carbon dioxide and 20% nitrogen by volume is formed. This oxygen-depleted gas is vented from the activated sludge system in line 5, either at the end of the oxygenation step in a batch type process, or continuously or intermittently in a continuous process wherein the oxygen feed gas is introduced continuously or intermittently.

In accordance with the present invention, the effluent in line 4 separated from the oxygenated mixed liquor in the activated sludge treatment and at least part of the vent gas flowing in line 5 are introduced to an activated carbon adsorption zone. In the adsorption zone, at least one bed of particulate activated carbon adsorbent is provided. The bed is supported in a containing vessel at its lower end and unconfined at its upper end to accomodate upflow expansion. The effluent introduced to the adsorption zone in line 4 and the vent gas introduced in line 5 are cocurrently flowed upwardly through the bed of activated carbon to expand the same, with the adsorbent-contacted effluent water being discharged from the adsorption zone in line 7 and oxygen-depleted waste gas being discharged in line 8.

As discussed above, at least part of the vent gas from the oxygenation zone is passed to the adsorption zone. The exact portion of the vent gas so used will depend on the initial oxygen feed gas concentration, the oxygen utilization in the activated sludge treatment, the vent gas composition and the contaminant characteristics of the wastewater being treated, particularly the contaminants in the effluent passed from the activated sludge zone to the activated carbon contacting step, together with the hydraulic behavior characteristics of the activated carbon bed. With respect to the latter, the volumetric flow rate of the gas entering the adsorbent bed must be sufficient to ensure adequate vapor-liquid distribution in the bed. On the other hand the flow rate of vent gas to the adsorbent bed should not be so large relative to the liquid flow that channeling is induced by the formation of excessively large gas bubbles. Thus any excess vent gas not needed in the activated carbon treatment step is discharged from the treatment system through lines 6 upstream of the adsorbent zone.

In the adsorption zone, the oxygen-depleted vent gas, containing 20–70% oxygen by volume, and preferably 40–60% oxygen by volume is introduced to the bed of activated carbon at a rate which is sufficient to maintain aerobic biological conditions in the adsorbent bed and maintain a dissolved oxygen concentration of at least 2 p.p.m. in the effluent being flowed therethrough. Under aerobic biological conditions, growth of viable aerobic microorganisms develop on the surfaces of the particulate activated carbon adsorbent. This growth permits the biodegardeable adsorbed contaminant species to be biologically assimilated by the biomass on the adsorbent particle, thereby removing the contaminant from the active sites on the activated carbon on which the contaminant was originally adsorbed. Such biological removal thus renews the active surface of the adsorbent for continued adsorption of sorbable contaminants. In this manner the capacity of the activiated carbon is appreciably enhanced relative to that obtained with straight adsorption so that the bed of activated carbon is able to remain on-stream in service for a considerably longer time than would be possible with straight adsorption before regeneration, as for example by backwashing or thermal regeneration, is necessary.

It will be observed that the above-described biological surface renewal of the adsorbent will increase removal of both the residual biodegradeable organic contaminants in the activated sludge secondary treatment effluent and also the non-biodegradeable adsorbable contaminants therein, since the removal of the biodegradeable contaminants by biological assimilation will free those active adsorbent sites on which the biodegradeable species would otherwise subsist in the absence of biological activity and so makes those sites available to both biodegradeable and non-biodegradeable species. In this fashion the adsorbent particles provide a synergistic effect by supporting and retaining the biological growth in the bed and by retaining the adsorbed biodegradeable species in contact with the biomass for sufficient duration to permit biological assimilation of those species.

In order to provide biological growth in the activated carbon bed, the bed may in practice be "seeded" with viable aerobic microorganisms upon start-up of the treatment system in the same manner as the secondary activated sludge treatment step is initiated, by introduction of cultures of the desired microorganisms into the treatment system under suitable nutrient and process conditions to ensure high growth rate and rapid stabilization of the microbial population. Alternatively, the tertiary activated carbon unit may be brought on stream after such start-up of the activated sludge segment of the system, with a small portion of the activated sludge being flowed with the secondary treatment effluent to the adsorbent bed, so that the activated sludge microorganisms adsorb on the activated carbon particles in the adsorbent bed and thus become available to effect biological removal of adsorbed biodegradeable contaminants therein.

The presence of the requisite aerobic biological condition in the activated carbon adsorbent bed in operation may readily be determined by oxygen component mass balance calculations performed around the adsorption zone on the inlet and outlet streams associated therewith, with a concurrent determination of the oxygen uptake rate (OUR) taking place in the adsorbent bed. Alternatively, the aerobic biological condition may be determined by unsteady-state biological respiration measurements and calculation of the OUR for the adsorbent bed by calculational procedures analogous to those used in the steady-state case.

To insure that adequate levels of biological activity take place in the adsorption zone, it is necessary in the practice of the present invention to maintain a dissolved oxygen concentration of at least 2 p.p.m. in the effluent flowed through the adsorption zone. Under such conditions the effluent contains the minimal level of oxygen necessary to sustain the microorganisms in the adsorbent bed in an active state. Although the effluent as discharged from the activated sludge treatment may contain significant levels of dissolved oxygen, as for example 4–6 p.p.m., such dissolved oxygen residuum would quickly be consumed in the inlet region adsorption zone and render the downstream portion of the zone anaerobic if the vent gas from the oxygenation zone were not flowed through the zone to maintain the necessary dissolved oxygen conditions. To secure high levels of aerobic biological removal per unit weight of adsorbent and to minimize the amount of adsorbent required in the adsorption zone, it is preferred in the broad practice of the present invention to maintain a dissolved oxygen concentration of at least 5 p.p.m. in the effluent being flowed through the adsorption zone.

Although the foregoing description has been directed to the utilization of a single unitary adsorbent bed in the adsorption zone, it will be apparent that more than one adsorbent bed may be advantageously employed. Thus, for example, it may be desirable in some instances to employ multiple adsorbent beds in series with the effluent being passed sequentially through the serial beds either together with the oxygen-containing waste gas from a preceding bed or with separate introduction of portions of the oxygenation zone vent gas to each of the serial beds. The latter gas introduction arrangement has the advantage that oxygen-containing gas may be introduced to the respective beds in amounts proportioned with respect to the biodegradeability characteristics of the contaminants in the effluent being treated therein. In such manner, the oxygen inputs to the serial adsorbent beds in the adsorption zone may optimally varied to achieve the highest contaminant removals and utilization of oxygen in the vent gas for the particular wastewater being treated. In addition, the use of multiple adsorbent beds in the adsorption zone permits one or more beds to be taken off-stream for regeneration while maintaining continuous active adsorption treatment in other, on-stream beds.

As discussed hereinearlier, in the Summary section, the present invention is based on the discovery that the waste gas discharged from an oxygenation activated sludge system can be utilized in an activated carbon adsorbent bed to sustain aerobic biological conditions and greatly prolong bed life before the sorptive capacity of the bed is exhausted and regeneration is necessary, to an extent far greater than that achieved by atmospheric air and roughly equivalent to that achieved by the use of pure oxygen gas as the aerating medium in the adsorption zone, and that in some instances the waste gas from the oxygenation zone is actually superior to pure oxygen in providing improved removal of total organic carbon (TOC) and biochemical oxygen demand (BOD) in the adsorption step as well as providing extended bed life. For example, it has been found in some cases involving the treatment of wastewater containing moderate concentrations of acidic organic components, the use of oxygenation zone vent gas in the adsorption zone has been observed to have enhanced the removal of these components by adsorption/bioxidation in the adsorption zone relative to the use of pure oxygen.

It has also been found that under this invention sufficient utilization of oxygen may be achieved from the oxygenation zone vent gas in the adsorption zone to permit the feed rate of oxygen gas introduced to the oxygenation zone to be increased to levels which would otherwise be uneconomical if the oxygenation and adsorption zones were not integrated in the manner of this invention. Such increase in oxygen gas feed rate provides a significant performance advantage in reducing the energy requirements for oxygen dissolution in the oxygenation zone of the process. This advantage derives from the higher oxygen partial pressures in the oxygenation zone which are associated with a greater flow rate for the oxygen feed gas and which permit less power to be used in achieving the same level of oxygenation treatment relative to oxygenation systems operating with conventional oxygen feed gas flow rates.

In the conventional enclosed chamber oxygenation systems operated according to the prior art, oxygen-depleted aeration gas is vented from the oxygenation chamber either intermittently or continuously to maintain a suitably high partial pressure in the gas phase therein, as for example at least 300 mm. Hg. Such partial pressure levels are necessary to achieve both a high percentage absorption from the oxygen feed gas and to maintain a high energy utilization efficiency for oxygen dissolution and mixing of the activated sludge biomass suspension, in order to obtain economic operation of the wastewater treatment system. In accordance with the present invention, economical operation can be obtained with significantly higher oxygen partial pressures in the oxygenation zone than conventionally employed, while simultaneously using substantially less power in the oxygenation step, as for example 13% less power than a corresponding oxygenation chamber not integrated in the manner of this invention, while achieving the same degree of wastewater BOD removal therein.

The present invention also affords the advantage of providing a treated effluent having a moderately high dissolved oxygen concentration (D.O.) together with low BOD and chemical oxygen demand (COD). In addition to removing a major portion of the BOD/COD in the wastewater treatment system, it is usually desirable to fortify it with dissolved oxygen (DO). This is done so as to provide a quantity of dissolved oxygen along with the effluent which approaches or attains a value equivalent by any BOD or COD still remaining in the effluent. The object is to prevent such BOD and COD from contributing toward an oxygen-deficient condition in the receiving stream. In some instances, an additional amount of dissolved oxygen is also desirable over and above that which is required to satisfy the residual BOD or COD of the effluent. This additional DO is desired so as to actually improve the quality of the receiving water above the level it would possess absent the discharge of effluent. This is in recognition of the fact that natural waters receive pollution from sources other than a "closed" wastewater treatment system, e.g., run-off of rainwater, effluent upstream and downstream of the municipal boundaries, and unauthorized "dumping" or drainage of pollution within the municipality. The present invention achieves a dissolved oxygen fortification of the effluent which serves partially to overcome such difficulties and accordingly permits improvement of the quality of the receiving waters for the treated wastewater effluent, in addition to providing improvement in overall levels of wastewater treatment.

Figure 2:
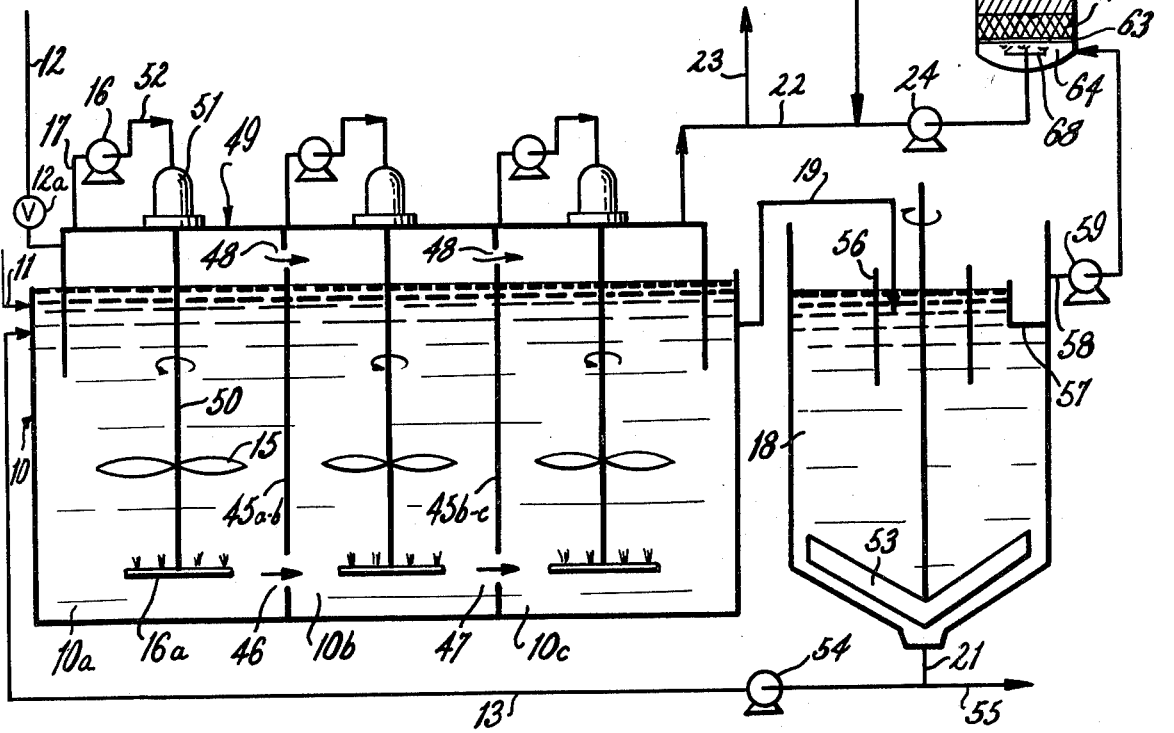
FIG. 2 is a schematic view of apparatus according to one embodiment of the invention which may be used to practice the wastewater treatment method of this invention.

FIG. 2 illustrates a specific apparatus configuration which may be used to practice one embodiment of the present invention. Influent wastewater containing biodegradeable organic contaminants is introduced to the enclosed oxygenation vessel 10 through line 11. Recirculated activated sludge is introduced to the oxygenation vessel in line 13, although it may be desirable in some instances to commingle the recycle activated sludge directly with the influent waste-water in line 11 by joinder of conduit 13 thereto so as to effect introduction of both wastewater and activated sludge to the oxygenation vessel through line 11.

As shown, the enclosed oxygenation vessel 10 is in the form of a liquid storage enclosure with vertical partition walls 45a–b and 45b–c spaced to provide three chambers 10a, 10b and 10c as oxygenation stages. The partition walls extend substantially to the floor of the storage enclosure and are joined thereto in fluid-tight relation. Flow of oxygenated liquid (liquor) through the stages of the oxygenation zone is provided by restricted flow opening 46 in the lower portion of the first-second chamber common partition wall 45a–b, and restricted opening 47 in the lower portion of the second-third common partition wall 45b–c. Unconsumed oxygen-containing gas flows through the oxygenation zone from chamber to chamber through restricted openings 48 near the top of the partition walls. The liquid storage enclosure is enclosed by a common cover 49 leak-tightly joined to the upper ends of the chamber partition walls to form gas spaces in each of the chambers. Accordingly, back mixing of oxygen-containing gas within the liquid storage enclosure from a succeeding chamber to a preceding chamber is avoided as long as a slight pressure differential is maintained.

In the illustrated system the wastewater and activated sludge introduction lines 11 and 13 are disposed to introduce the wastewater and activated sludge to the first oxygenation chamber 10a. Sludge is recycled to the first oxygenation chamber 10a at a rate sufficient to maintain the desired total solids concentration (MLSS), as for example 6000 milligrams/liter (mg/l), and volatile suspended solids concentration (MLVSS), as for example 4500 mg/l. Broad suitable ranges for these parameters are 2500–10,000 mg/l., MLSS and 2000–8000 mg/l MLVSS. The food-to-biomass ratio may be in the range of 0.2 – 1.55 gm BOD/ (day x gm MLVSS), for example about 0.68. The recycled sludge concentration is in the range of 10,000 – 50,000 mg/l.

Feed gas containing at least 50% oxygen by volume and preferably at least 80% oxygen by volume is introduced in sufficient quantity to maintain dissolved oxygen concentration in the liquid in the oxygenation vessel at 2–10 mg/l and for example 6 mg/l. Oxygen flow control valve 12a may be automatically adjusted in response to sensed D.O. level or to gas pressure in the overhead gas spaced as monitored by suitable sensor and transmitting means (not shown).

Gas-liquid contacting means are positioned in each of the oxygenation chambers for mixing the oxygen-containing gas and liquor and simultaneously continuously circulating the oxygen-containing gas against the wastewater-activated sludge liquor therein. These gas-liquid contacting means for each chamber include blades 15 submerged in the liquor and joined by a rotatable shaft 50 to suitable drive means such as gearbox and motor 51. The fluid circulation means comprise withdrawal conduit 17 joined to the cover 49, compressor 16, return conduit 52 in flow communication with the inlet side of hollow shaft 50 driven by motor 51, and sparger 16a positioned at the lower end of the shaft 50 beneath blades 15. Small oxygen-containing gas bubbles are discharged from the sparger 16a by the pressure of the pump 16 and are distributed through each chamber in intimate contact with the wastewater-activated sludge liquor and rise through the liquor to the surface where the unconsumed portion disengages into the gas space along with the oxidation reaction product gases. Gas-liquid contacting aeration devices are commonly rated by the so-called "air standard transfer efficiency" which identifies the capability of the device to dissolve oxygen from air into zero D.O. tap water at one atmospheric pressure and 20° C. Suitable devices are those which have an air standard transfer efficiency of at least 1.5 lb. $O_2$ per HP - hr. For these purposes the power used in rating the device is the total power consumed both for agitating the liquor and for gas-liquid contacting.

In the first oxygenation chamber 10a, the influent wastewater, recycle activated sludge and introduced oxygen feed gas are mixed and the oxygen-containing gas is simultaneously continuously recirculated against the wastewater-activated sludge suspension for sufficient duration, as for example 20 – 30 minutes, to form a first oxygenated liquor and first unconsumed oxygen-containing gas. The resultant first oxygenated liquor is transferred from the first oxygenation chamber to the second oxygenation chamber through the restricted flow opening 46 in the first - second chamber partition wall 45a–b. Simultaneously, the first unconsumed oxygen-containing gas from the first oxygenation chamber is passed to the second oxygenation chamber through restricted passageway opening 48 in partition wall 45a–b. In the second oxygenation chamber 10b, the so-transferred first oxygenated liquor and first unconsumed oxygen-containing gas are mixed and the oxygen-containing gas is simultaneously continuously recirculated against the liquor for sufficient duration, which may again be on the order of 20–30 minutes, to form second oxygenated liquor and second unconsumed oxygen-containing gas of lower oxygen purity than the first unconsumed oxygen-containing gas. From the second oxygenation chamber the second unconsumed oxygen-containing gas and second oxygenated liquor are respectively passed through partition wall 45b–c openings 48 and 47 into the third oxygenation chamber 10c for final mixing and recirculation therein by the third gas-liquid contacting means to form finally oxygenated liquor and oxygen-depleted vent gas. The oxygen-depleted vent gas, containing 20–70% oxygen by volume and for example 50% oxygen is discharged from the final oxygenation chamber 10c through gas vent line 22.

In the above-described oxygenation zone, the oxygenated liquor from each stage is discharged and preferably introduced to the next succeeding stage in concurrent flow relation with the unconsumed oxygen-containing gas for mixing and recirculation of the fluids in the subsequent stage. Cocurrent gas-liquor flow through a multiplicity of oxygenation stages is preferred to satisfy the inherent variation in BOD or the water to be treated and of the succeeding partially oxygenated liquor. The feed gas representing the highest purity oxygen is contacted with the feed wastewater in the first stage. Accordingly, the first or feed gas stage has the highest oxygen partial pressure and thus the highest oxygen transfer potential. Therefore the high oxygen demand in this stage can be supplied without excessive power consumption.

The oxygenated mixed liquor is discharged from the third and final oxygenation chamber 10c through discharge flow conduit 19 and is introduced to clarifier 18 for separation into supernatent purified liquor and activated sludge. The mixed liquor enters the clarifier via stilling well 56 which serves to distribute the mixed liquor uniformly in the clarifier and to damp any excessive velocities of the introduced liquor flow which may otherwise detrimentally affect the separation efficiency of the clarifier. Clarifier constructions are well known to those skilled in the wastewater treatment art and may for example include rotatable scraper 53 at the lower end to prevent coning. The activated sludge is withdrawn through bottom conduit 21 and at least part, e.g. 85 percent by weight thereof, is recycled through pump 54 in conduit 13 to the first oxygenation chamber 10a for mixing with BOD-containing feed water and oxygen-containing feed gas. Any excess sludge produced in the oxygenation treatment may be delivered to waste or further treatment steps, e.g. aerobic digestion, by waste conduit 55. The purified effluent liquid is removed in clarifier 18 by overflow into weir trough 57 and discharged from the clarifier in line 58.

The purified effluent liquid discharged from the clarifier of the activated sludge zone in line 58 will contain some residual biodegradeable organic contaminants which have not been biologically assimilated by the activated sludge biomass in the oxygenation zone. For example, with a moderately high strength industrial/municipal wastewater entering the treatment system, e.g. on the order of 600 mg/l BOD, the BOD of the effluent from the activated sludge segment of the system may be as high as 80–100 mg/l. This effluent is pressurized in liquid pressurizing pump 59 in line 58 to a pressure, e.g. 10 to 20 psig, sufficient to overcome the head loss across the downstream adsorbent bed 75. As indicated earlier, this liquid stream may contain a significant D.O. concentration residuum from the oxygenation step, as for example 5 mg/l and is saturated in highly soluble $CO_2$ with respect to the oxygen-containing gas in the final oxygenation stage gas space.

The oxygen-depleted vent gas discharged from the final oxygenation chamber 10c, containing for example 50% oxygen by volume, may have a pressure of only a couple of inches of water at the point of discharge into the vent line 22. Any excess vent gas not required for the further adsorption step is wasted from the system through line 23. The remaining vent gas in line 22 is joined with recycle gas from line 25 and the resultant combined stream is pressurized in blower 24 to a pressure which may be on the order of that of the liquid in line 58 which has been pressurized by pump 59, e.g. 10–20 psig.

The pressurized liquid in line 58 is introduced to the lower end of adsorbent bed 75 and the pressurized gas in line 22 is introduced thereto via sparger device 68 disposed in the plenum space 64. The adsorption zone 75 includes an adsorbent vessel 60 with enclosing side and bottom walls containing a bed 61 of particulate activated carbon adsorbent bearing against the side walls of the adsorbent vessel. The activated carbon may be in granular form with an average mesh size of about 8 mesh. The adsorbent bed 61 is supported within the adsorbent vessel at its lower end, resting upon a small volume of particulate refractory material which in turn is supported by a support screen or grid 63 fixedly joined to the side walls of the vessel. The purpose of the refractory materials, which may be in the form of small diameter balls, is to trap any particulate solids which have not been separated in the clarifier 18 and which might tend to clog the bed of finely sized activated carbon granules, and also to prevent attrition of activated carbon by abrasion of the adsorbent against the support screen 63. If the suspended solids in the effluent from clarifier 18 are relatively high, it may be desirable to employ suitable filter means in line 58 upstream of the adsorption zone for removal of a major part of the suspended solids. It will be appreciated that in some instances it may not be necessary to utilize such support media layer 62, as where the adsorbent utilized is highly abrasion-resistant and where the level of solids in the effluent from the clarifier 18 is suitably low.

The adsorbent bed is unconfined at its upper end 65 in the adsorbent vessel to allow for free rise and expansion, i.e. partial fluidization by the upflowing effluent liquid and oxygen-containing gas dispersion. Oxygen-depleted waste gas disengaging from the contacted liquid at the gas-liquid interface 69 is collected in the upper plenum space of the adsorbent vessel and discharged in waste gas discharge line 71. A portion of this waste gas, if necessary for efficient hydraulic behavior of the adsorbent bed, or desirable for high utilization of the oxygen in the vent gas passed to the adsorbent vessel, may be recycled through line 25 joining the waste gas discharge line 71 with the vent gas line 22 to augment the gas being introduced to the adsorbent bed. Final effluent water, depleted in residual biodegradeable organic contaminants is discharged from the adsorbent vessel above the interfacial level 65 of the expanded adsorbent bed, through line 70.

By means of the foregoing arrangement cocurrent upward flow of the introduced oxygen-depleted vent gas and effluent through the adsorbent bed is provided and aerobic biological conditions are maintained in the adsorbent bed for physical adsorption and biochemical oxidization of the residual organic contaminants in the effluent flowed through the adsorbent bed. The oxygen-depleted vent gas and effluent are intimately commingled in the expanded adsorbent bed and the extended surface area of the particulate adsorbent functions as contacting area to enhance the gas-liquid contact. In this fashion oxygen in the introduced vent gas is dissolved in the cocurrently flowing effluent and made available to the biological growths on the active surfaces of the adsorbent particles. Expanded bed operation permits the biological growths on the particles to reach appreciable size before backwashing is necessary, without clogging of the interstital flow areas between the adjacent adsorbent particles in the bed by extended growth. Expanded bed operation also renders the adsorbent bed highly resistant to plugging by residual suspended solids in the effluent passed to the adsorption zone from the clarifier. As discussed hereinabove, the volumetric flow rate of gas introduced to the adsorbent bed must be adequate to ensure proper liquid-gas distribution. For a bed as shown and described in connection with FIG. 2 the volumetric vent gas flow rate to the bed may for example need to be at least 10% of the volumetric flow rate of effluent entering the bed to ensure sufficient liquid-gas distribution. Under such conditions, the final effluent water discharged from the adsorption zone in line 70 to final receiving waters may have a D.O. level of about 4 mg/l together with a negligible level of contaminants therein. The provision of such high quality effluent may be achieved with 90–95% utilization of the oxygen supplied in the feed gas to the system, and at a significantly lower expenditure of power in the oxygenation step than could be achieved without the present invention.

In the activated sludge process, the recycle sludge for the oxygenation step consists essentially of flocculent agglomerates of aerobic organisms which have the ability, in the presence of sufficient dissolved oxygen, to first absorb, then assimilate and oxidize the organic material of the feed water. This adsorption-assimilation sequence occurs in the oxygenation zone of the present process, and in the FIG. 2 embodiment the sequence is substantially completed upstream of the separation zone 18. The wastewater-activated sludge cuontact time in oxygenation zone 10 for organic food adsorption-assimilation may for example be between about 10 minutes and 24 hours. This time varies depending upon the strength (BOD content) of the wastewater, the type of pollutant, solids level in aeration and temperatures. A maximum retention period of 24 hours will usually provide adequate time to remove BOD from effluent, to activate the sludge, and perform a reasonable degree of autooxidation (endogeneous respiration) if desired. When several oxygenation stages are employed, the retention period in the oxygenation zone refers to the total time the biomass solids (the total bacteria present) together with the BOD of the feed water are held in all oxygenation stages. In the FIG. 2 embodiment where the oxygenation zone 10 is entirely upstream of the clarifier 18, the contact time is calculated as the total liquid volume of stages 10a, 10b and 10c divided by the volumetric flow rate of combined BOD-containing feed water and activated sludge recycle. In the FIG. 3 embodiment wherein the oxygenation zone 130 is partly upstream and partly downstream clarifier 129 (as discussed hereinafter in detail), the contact time for a given quantity of BOD plus biomass is calculated as the sum of the contact times upstream and downstream of the intermediate clarifier. The upstream contact time is calculated by dividing the upstream liquid volume of stages 130a and 130b by the volumetric flow rate of combined BOD-containing feed water and activated sludge recycle. The downstream contact time is calculated by dividing the downstream liquid volume of stage 130c by the sludge discharge rate from the clarifier flowing to stage 130c.

It is desired to extend oxygen treatment on the biomass beyond the period required to assimilate and oxidize the wastewater's BOD, then the fraction of the organisms of the sludge which themselves are destroyed and consumed by biological oxidixation can become significant. Carrying (endogeneous respiration) to an extreme in the oxygenation zone should be avoided because it reduces the activity of the biomass to be recycled in the return sludge and impairs its settlability. Moreover, retaining the treated biomass under long term oxygenation is expensive because liquid enclosure tankages become prohibitively large and power consumption is greatly increased.

If the sole objective is to assimilate and oxidize the BOD of the influent BOD-containing water, than a relatively short contact time will suffice.

Contact times not exceeding 180 minutes are usually satisfactory in multiple staged-cocurrent flow oxygenation systems treating relatively low strength municipal waste liquids, e.g. having up to about 300 mg/l. BOD. For higher strength wastes as for example those discharged from petrochemical plants, longer contact times on the order of 5–12 hours are necessary to yield an effluent of comparable purity.

In the practice of this invention, it is preferred to maintain high suspended solids concentration in the oxygenation zone. The BOD-containing water-activated sludge volatile suspended solids content is preferably at least 3,000 mg/l. One reason for this preference is that the solids concentration in the oxygenation zone affects the rates of the biochemical reactions occurring in the system. In the treatment of municipal sewage, the suspended solids comprise: (1) biologically oxidizable organic material, (2) non-biologically oxidizable organic material, and (3) non-oxidizable non-organic material. The non-organic material such as sand and grit, and the non-biologically oxidizable material such as polyethylene particles or cellulose are undesirable but unavoidable components of the BOD-containing water, e.g., sewage, entering the aeration zone. Normally relatively large particles, e.g. wood chips, are usually removed in a pretreatment step.

The major fraction of the total solids in the mixed liquor, e.g., 70 percent thereof, consists of bacterial floc (biomass) in the activated sludge recirculated from the clarifier to the oxygenation zone. The higher the concentration of bacteria, the more rapid will be the adsorption and assimilation of BOD, assuming other requirements are also met such as dissolved oxygen supply.

Figure 3:
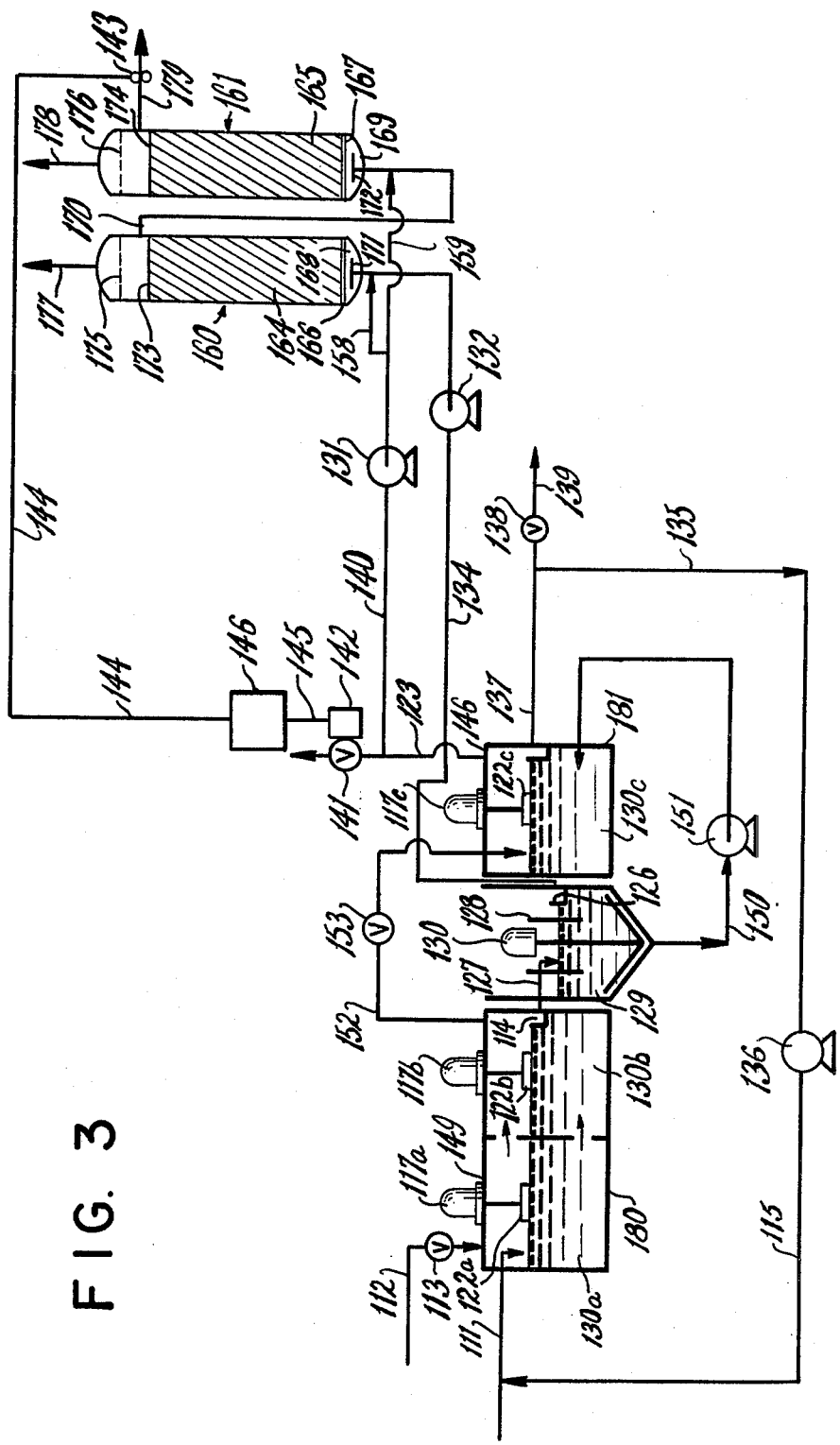
FIG. 3 is a schematic view of another apparatus embodiment of the invention adapted for contact stabilization treatment of wastewater.

FIG. 3 is a schematic view of another apparatus embodiment of the invention adapted for contact stabilization treatment of wastewater. This apparatus differs from the previously described multi-stage system in that clarifier 129 is positioned intermediate between second oxygenation chambers 130b and third oxygenation chamber 130c. The oxygenation zone is thus divided into two sections, the first comprising stages 130a and 130b and the second section comprising stage 130c. The advantage of this arrangement is that only the reduced volume stream of concentrated activated sludge is processed in the third oxygenation chamber downstream from clarifier 129.

More specifically, BOD-containing wastewater, and the recycle activated sludge joined therewith from recycle line 115, are introduced in line 111 to the first oxygenation chamber 130a in liquid storage enclosure 180 enclosed by cover 149. Feed gas containing at least 50% oxygen by volume is introduced in conduit 112, having feed gas flow control valve 113 therein, to the first oxygenation chamber. In the first oxygenation chamber, the wastewater, activated sludge and oxygen feed gas are mixed by gas-liquid contacting means comprising a rotatable surface impeller 122a and drive means 117a therefor. The rotatable surface impeller throws massive sheets of liquor into the enclosed gas space above the liquor level and thereby performs the fluid recirculation function. The mixing and recirculation are performed in the first oxygenation chamber 130a for sufficient duration, e.g., 10 to 20 minutes, for the biomass present to partially adsorb the BOD and to form first oxygenated liquor and first unconsumed oxygen-containing gas.

The first oxygenated liquor and first unconsumed oxygen-containing gas are cocurrently flowed from the first oxygenation chamber 130a to the second oxygenation chamber 130b through restricted gas and liquor flow openings in the partition wall therebetween extending from the floor of liquid storage enclosure 180 to cover 149. In the second oxygenation chamber the transferred gas and liquor are further mixed and gas is recirculated against the liquor by second gas-liquor contacting means comprising rotatable impeller 122b and drive means 117b. Such mixing and fluid recirculation is carried out for sufficient time, which may again be on the order of 10-20 minutes to complete the BOD adsorption by the biomass to form second oxygenated liquor and second unconsumed oxygen containing gas. The oxygenated liquor overflows internal weir 114 in the second oxygenation chamber and is discharged from the oxygenation chamber in line 127. This oxygenated liquor is passed to the clarifier separating means 129. In the clarifier, the terminal outlet end of conduit 127 is disposed within concentric baffle 128. The baffle serves to form a stilling well for the oxygenated liquor introduced to the clarifier by the conduit and preferably extends from above the liquid level in the clarifier to a point intermediate this level and the clarifier's conical bottom. In the clarifier the oxygenated liquor is separated by the settling out of activated sludge solids. Motor 130 drives a slowly rotating rake across the clarifier bottom to prevent "coning" of the dense settled sludge. In the clarifier, a solids-depleted purified supernatent liquid is formed which rises in the clarifier to the liquid-air interface and overflows weir 126 into the associated trough for discharge through conduit 134. The settled BOD-enriched sludge is withdrawn through conduit 150 and at least a portion thereof is pressurized by pump 151 for flow thereof to third oxygenation chamber 130c. The third oxygenation chamber is provided in liquid storage enclosure 181 having cover 146 gas-tightly joined to the upper ends of the side walls of the liquid storage enclosure. Third gas-liquid contacting means are provided in the third oxygenation chamber comprising rotatable bladed impeller 122c and motor drive means 117c. Unconsumed oxygen-containing gas is flowed from the oxygenation zone first section (stages 130a and 130b) to the oxygenation zone second comprising oxygenation chamber 130c in transfer line 152 having flow control valve means 153 disposed therein.

In the third oxygenation zone 130c the second unconsumed oxygen-containing gas and BOD-enriched sludge are mixed and sludge is recirculated agaist the overlying gas for sufficient time for the sludge to assimilate the BOD and form activated sludge and third unconsumed oxygen-containing gas. The activated sludge is withdrawn from the third oxygenation zone in line 137 and is at least partly recycled through conduits 135 and 115 to the first oxygenation zone 130a as the activated sludge therefor. The conduits 135 and 115 are joined by recycle sludge pump 136. The volume ratio of recycling active sludge/BOD-containing water may be maintained in the range of 0.1 to 0.5. This ratio may be maintained by varying the speed of pump 136. Any sludge not needed for recirculation may be removed from the system through sludge waste line 139 having control valve 138 therein.

The third unconsumed oxygen-containing gas is discharged from the third oxygenation chamber 130c as vent gas containing 20–70% oxygen by volume in line 123. At least part of this vent gas is diverted into line 140 for passage to the activated carbon tertiary treatment step. Any excess vent gas not needed in the tertiary treatment step is discharged from the system through valve 141.

In the tertiary treatment, the effluent from the clarifier 129 in line 134 containing residual biodegradeable organic contaminants is pressurized in liquid pressurizing pump 132 to a level sufficient to overcome the pressure drop across the adsorption zone. Likewise the oxygen-dpeleted vent gas diverted into line 140 is pressurized to suitable pressure level by blower 131. The pressurized effluent liquid in line 134 is then joined with a first part of the pressurized vent gas in line 140 diverted by branch conduit 158. The resultant gas-liquid mixture is introduced into the lower end of first adsorbent vessel 160, into the lower plenum space 168 through sparger device 171 which may for example comprise a porous ceramic plate sparging surface.

As in the previously described system, the adsorbent vessel 160 has enclosing side and bottom walls and contains a bed of particulate bearing against the side walls thereof. The bed is supported in the vessel at its lower end upon support grid 166 and is unconfined at its upper end to allow expansion of the bed during operation, as for example by 5 to 15 volumes %. Oxygen-depleted waste gas disengages from the contacted liquid at the liquid-gas interface 175 in the upper plenum space in the adsorbent vessel and is discharged from the system in line 177. The effluent flows upwardly through the bed cocurrently with the simultaneously introduced gas, from the lower plenum space 168 upwardly to above the upper surface 173 of the expanded adsorbent bed and is discharged in line 170 from the adsorbent vessel. In this arrangement, aerobic biological conditions are maintained in the adsorbent bed for physical adsorption and biochemical oxidization of the residual organic contaminants in the effluent flowed therethrough.

Intervessel conduit 170a is joined to the first effluent water discharge line 170 for transferring the first effluent water from the first adsorbent vessel 160 into the second adsorbent vessel 161 at its lower end. Prior to such introduction a second part of the diverted vent gas in line 159 is joined with the first effluent water in conduit 170a to form a gas-liquid mixture which is passed into the lower plenum space 169 in vessel 161 via sparger 172. The construction of the second adsorbent vessel 161 is similar to that of the first vessel 160. The former contains a bed of particulate activated carbon adsorbent supported on grid 167 in flow communication with the upper plenum gas space in the vessel for discharging second oxygen-depleted waste gas from the vessel, and line 179 for discharging second effluent from the second adsorbent vessel at its upper end. Thus, the introduced oxygen-depleted vent gas and first effluent water cocurrently flow upwardly through the second adsorbent bed and maintain aerobic bacteriological conditions therein for physical adsorption and biochemical oxidization of the residual organic contaminants in the effluent flowed through the adsorbent bed. In the adsorbent vessel the bed is expanded to a height corresponding to the interface 174 and contacted vent gas disengages from the contacted liquid at the gas-liquid interface 176.

The treatment system of FIG. 3 may suitably employ a control circuit for regulating the proportion of oxygen-depleted vent gas which is passed to the adsorption zone, in order to maintain a predetermined D.O. concentration in the final effluent water discharged from the adsorption zone and thereby insure optimal maintenance of aerobic bacteriological conditions in the constituent adsorbent beds. The control system for the FIG. 3 system comprises a dissolved gas probe 143 for sensing the disolved oxygen concentration of the effluent water discharged from the system in line 179, with D.O. sensing transmitting means 144 coupling the probe 143 and controller 146, which in turn is linked by control signal transmitting means 145 to the actuator 142 on vent gas valve 141. In practice probe 143 is preferably of a type which generates a difference in electrical potential between an electrode immersed in the effluent water and a reference electrode isolated from the liquid. The potential difference signal generated by probe 143 may then be transmitted by wire 144 to controller 146 for generation of a valve actuator control signal in response to the sensed dissolved oxygen concentration which is then transmitted to valve actuator 142 to cause opening or closing of valve 141 to the desired extent so as to maintain a predetermined dissolved oxygen concentration in the effluent water discharged in line 179.

Thus, if the D.O. in the effluent water drops below the set point level due to insufficient introduction of vent gas to the adsorption zone the controller-activator elements operate to further close the valve 141 so that correspondingly more vent gas is diverted to the adsorption zone in line 140. In this manner the predetermined D.O. level in the effluent water in line 179 is maintained despite variation in liquid loading and biodegradeability characteristics of the contaminants in the wastewater being treated. In accordance with the invention, the effluent water in line 179 must contain at least 2 p.p.m. D.O. and preferably at least 4 p.p.m. D.O. to insure that efficient aerobic biological conditions are maintained in the adsorption zone. Below 2 p.p.m. D.O., the biological growth in the adsorbent beds is limited to ineffective levels since there is insufficient oxygen concentration driving force to penetrate thickness of the adherent biomass layers associated with attached growth. As a result, comparatively low levels of biodegradeable organic contaminant removal are achieved in the activated carbon treatment. In addition, below 2 p.p.m. D.O., the activated carbon adsorption zone tends to run at least partially anaerobic with formation of noxious hydrogen sulfide gas in the bed and low biodegradeable organic contaminant removal levels. With the introduction of vent gas from the activated oxygenation zone to the adsorption zone it is possible to overcome such problems with high dissolved oxygen levels, which may in practice be as high as 8–10 mg/l. without excessive compression power expenditure in pressurizing the liquid and vent gas streams entering the zone.

Although the foregoing description has been directed to the use of partially expanded adsorbent beds, it may be desirable in some applications to employ fluidized beds of particulate activated carbon adsorbent in the adsorption zone. Alternatively, pulsed beds of activated carbon could be employed wherein increments of the spent (loaded) carbon are removed in a direction countercurrent to the wastewater flow for thermal regeneration. The regeneration of the activated carbon adsorbent in the specifically described embodiments of the invention may be carried out in any suitable manner, by conventional methods as are well known in the art.

One of ordinary skill might conclude that discarding the vent gas from the oxygenation zone and feeding pure oxygen separately to the adsorption zone would achieve performance which is superior to that obtained when gas from the oxygenation zone is reused in the adsorption zone. For example, if 60 percent oxygen utilization were obtained in each of the two zones on independent oxygen feed streams, the overall oxygen utilization is also about 60 percent. Moreover, feeding pure oxygen to the adsorption zone would appear to provide a higher oxygen partial pressure in the adsorption zone as compared to the integrated oxygen system of this invention wherein $CO_2$ and nitrogen evolved in the oxygenation zone are carried forward into the adsorption zone. This presumption is strengthened when $CO_2$ equilibrium effects are considered. The large volume of the mixed liquor flowing through the oxygenation zone provides large holding capacity for dissolved $CO_2$. As a result, the major portion of the $CO_2$ resulting from oxidation of BOD remains in solution and does not contaminate the oxygenation gas. Nonetheless, the effluent from the activated sludge step is flowed at moderate flow velocity over the adsorbent particles in intimate admixture with the oxygen-containing gas, so that conditions are created which would appear to be conducive to release of $CO_2$ in large amounts in the adsorption zone. Futhermore, the use of separate feed oxygen gas in the adsorption zone would appear to be superior to the reuse of oxygenation zone vent gas for the reason that the vent gas, even though it may have a relatively high oxygen concentration, e.g. 50–60% by volume, in some instances, will have a flow rate which is only a small fraction of the oxygen feed gas flow rate. Thus, the actual physical volume of oxygen in the vent gas which is available for further utilization is small and this in fact has been a key to the economic success of the recently developed oxygenation systems, which 'lose' through venting only a very small amount of the oxygen fed to the system. Accordingly, the vent gas, containing only a small volume of oxygen which additionally is heavily diluted by $CO_2$, nitrogen and other gas constituents, would appear to be substantially inferior to the use of a separate stream of oxygen feed gas to the adsorption zone.

Despite the foregoing considerations, it has been unexpectedly found that (1) there is a sufficient amount of oxygen in the gas vented from the oxygenation zone to meet the oxygen requirements of the adsorption zone, (2) the vent gas is generally equivalent to pure oxygen in extending the operating life of the activated carbon adsorbent beyond the life achieved with straight adsorption and with the same effluent water requirements in both cases, and (3) higher oxygen utilization at the same oxygenation power expenditure or, alternatively, lower power requirement for the same oxygen utilization level can be achieved with the vent gas as compared to a separate stream of oxygen feed gas. In line with these differences, the use of oxygenation zone vent gas has been found to be significantly superior to pure oxygen from an economy standpoint.

The remarkable oxygen economy of the system is achieved by a fortuitous and unobvious matching of the oxygen requirements for biologically assisted adsorptive removal of residual biodegradeable organic contaminants and for DO-enrichment on one hand, and the oxygen requirements for purification by biochemical oxygenation in the activated sludge step (on the other hand). This matching is in part due to the very high oxygen utilization efficiency and remarkably complete removal of BOD which are achievable when oxygen is effectively used in the oxygenation-activated sludge step.

The reasons for the closely equivalent performance of vent gas relative to the use of pure oxygen in the adsorption zone is not fully understood, but may be due in part to the fact that under the mixing conditions required for oxygenation of the influent wastewater, the oxygen-containing gas vented from the oxygenation zone tends to be close to equilibrium with respect to the oxygenated liquor discharged from the zone. Thus, when the vent gas and the effluent separated from the mixed liquor are again brought into contact in the adsorption zone, the dissolved gases in the effluent are in approximate equilibrium with the corresponding components in the vent gas and hence the former do not evolve from the liquid phase and pass into the gas phase in such appreciable amounts as to further impair the mass transfer driving force (gas phase concentration) for the oxygen component. On the other hand, such dissolved gas components — i.e., $CO_2$, nitrogen and the like — may be appreciably stripped from the liquid in the adsorption zone consisting of separate oxygen feed gas and effluent and contribute to a lowered mass transfer performance and consequent lower utilization of oxygen for the separate feed arrangement.

The following examples illustrate the specific advantages of the present invention, as compared to prior art systems lacking the improvement features of the process and apparatus of this invention.

EXAMPLE I

In the first test five parallel activated carbon adsorption units were concurrently operated for treatment of activated sludge secondary effluent in order to evaluate the present invention. The effluent was obtained from the East clarifier at the South Charleston Waste Treatment Works, where an air activated sludge system is employed to treat a combined wastewater comprising 70% industrial petrochemical waste and 30% municipal sewage.

The experimental apparatus consisted of five glass columns each 3.5 cm. in diameter and 122 cm. in height and containing a 61 cm. deep bed of granular activated carbon (Westvaco "Nuchar" WV-G, 12 × 40 mesh, manufactured by Westvaco Corporation, New York, N.Y. 10017). Each column was simultaneously fed wastewater effluent in an upflow mode, with introduction of the effluent at the bottom of the bed and removal of contacted effluent water at the top thereof, at a nominal rate of 485 ml/hr. (1 bed volume/hr.) by an individual micro-bellows pump from a common 55-gallon feed storage drum. Gas feed to each column was introduced through diffusion stones at the bottom of the column at a rate of 10 standard milliliters/minute. The gas feed streams were varied for the five columns as follows: Column 1 = pure oxygen; Column 2 = 50% $O_2$, 30% $CO_2$ and 20% $N_2$ by volume (representative of typical oxygenation system vent gas); Column 3 = air; Column 4 = pure nitrogen; column 5 = straight adsorption — no gas. The purpose of the column 4 and 5 operation was to identify purely mechanical or hydraulic effects of gas flow through the bed.

The above-described system was operated for an extended period of approximately 1200 hours. The BOD in the wastewater effluent fed to the adsorbers varied during the test from about 7 to 160 mg/l and the TOC showed a variation of from about 80 to 160 mg/l. All five adsorbent columns were backwashed at the same frequency, once every 13 days, to prevent plugging of the columns by biomass or effluent suspended solids. At various times, approximately once every 24 hours, determinations were made of biochemical oxygen demand (BOD) and total organic carbon (TOC) remaining in the final effluent water withdrawn from the columns. All measurements during these tests were conducted in accordance with the standard practices of the waste treatment industry as for example outlined in "Standard Methods for the Examination of Water and Wastewater," published by the American Public Health Association, Inc., 13th ed. (1971).

In the early stages of the test, all of the first three columns (1, 2, and 3) utilizing an oxygen-containing gas flow therethrough were about equally effective in enhancing BOD and TOC removals, compared to straight adsorption. TOC removal was not complete in any of the adsorbers due to the presence of residual organic contaminants, which were neither readily biodegradeable nor easily adsorbed. The ungassed and nitrogen-fed adsorbers (columns 4 and 5) were exhausted after a cumulative throughput of 320 liters of effluent (640 bed volumes) based on BOD removal. Exhaustion was not as rapid on a TOC removal basis in these beds because of their continued removal of non-biodegradeable organic contaminants.

The results of BOD and TOC analyses toward the end of the run, at 440 liters of effluent cumulative throughput (880 bed volumes) and 401 liters of effluent cumulative throughput (802 bed volumes) respectively, are set forth below in Table I.

TABLE I

| Adsorber Column | Applied Gas | BOD Removal at 440 l. Throughput | | | TOC Removal at 401 l. Throughput | | |
|---|---|---|---|---|---|---|---|
| | | Influent Concentration (mg/l) | Effluent Concentration (mg/l) | % Removal | Influent Concentration (mg/l) | Effluent Concentration (mg/l) | % Removal |
| 1 | pure oxygen | 55 | 14 | 74.8 | 95 | 33 | 65.3 |
| 2 | 50%$O_2$, 30%$CO_2$, 20%$N_2$ (by volume) | 55 | 12 | 78.2 | 95 | 30 | 68.4 |
| 3 | Air | 55 | 28 | 49.2 | 95 | 37 | 61.1 |
| 4 | pure nitrogen | 55 | 60 | nil | 95 | 43 | 54.8 |
| 5 | Straight adsorption-no gas | 55 | 60 | nil | 95 | 48 | 49.5 |

In the latter stages of the run, the data show that the columns through which pure oxygen and vent gas mixture were passed (columns 1 and 2) were significantly more effective in maintaining high removals of BOD relative to the column through which air was flowed (column 3), while the anaerobic columns (columns 4 and 5) were completely exhausted, i.g., had completely lost their adsorptive capacity for BOD and thus required regeneration. As shown, the pure oxygen and vent gas mixture were about equally effective, with the latter providing somewhat higher % BOD removal than the former. The fact that the data for the anaerobic columns (4 and 5) showed higher BOD effluent concentrations than the influent BOD level may be attributable to anaerobic decomposition of inorganic and aerobically non-biodegradeable organic contaminants in the liquid fed to the adsorption zone into additional aerobically biodegradeable species and/or decomposition of easily biodegradeable species into less biodegradeable components.

The same general performance advantages as described above for BOD removal were obtained in the pure oxygen and vent gas mixture gassed columns for TOC removal, although the differences in % removal between the various columns was not as great in the case of BOD removal. As mentioned, the anaerobic columns 4 and 5 still retained capacity for removal of TOC even though their BOD removal capacity was exhausted. Such behavior indicates that the activated carbon adsorbent had a lower adsorptive capacity for the biodegradeable portion of the feed, in the absence of in situ biological regeneration of the absorbent active surfaces, than for some of the non-biodegradeable organic constituents whose removal appears as TOC reduction.

The foregoing results show the advantages of the present invention relative to prior art activated carbon adsorption systems, as including a greatly increased adsorption adsorbent bed life before exhaustion on a BOD removal basis and improved removal of BOD and TOC in the adsorption zone. Although their benefits were also attained by the use of air and pure oxygen, the vent gas mixture was slightly superior in performance, particularly in the later stages of the adsorption run.

EXAMPLE II

In this test, the above-described columns 1, 2 and 3 were operated to test their capacity for removal of acidic organic contaminants. Such contaminants are frequently encountered in the treatment of industrial wastewaters, such as chemical plant or refinery wastes.

For this test, the operation of columns 1, 2 and 3 as described in Example I was continued through an additional study phase with the secondary effluent feedstock "spiked" with approximately 500 mg/l of acetic acid. Columns 4 and 5 were shut down during this phase of the study since they were already exhaused on a BOD removal basis. In this test the operation continued for an extended period of time corresponding to approximately 600 liters of secondary effluent cumulative throughput (1240 bed volumes), under the same flow conditions as described in Example I. Daily analyses were conducted for feed and effluent pH and acetic acid concentrations were monitored by flame ionization gas chromatography conducted at 140° C based on 3 ml. samples of the wastewater.

The results of the test are set forth in Table II below, showing feed and effluent pH and acetic acid (HAc) concentration values at various cumulative throughput levels of secondary effluent (feed). These results show that column 2, through which the oxygen-containing vent gas mixture was flowed, performed somewhat better than column 1 in which pure oxygen was passed through the adsorbent bed at cumulative throughput levels of up to 524 liters of secondary effluent (0.6 mg HAc/l for column 2 versus 1.3 mg HAc/l for column 3). Pure oxygen was superior to the vent gas mixture at higher cumulative throughput valves (above 524 liters), but, as discussed more fully hereinafter, the use of the vent gas mixture permits significant improvement in oxygen utilization and oxygenation horsepower requirements to be achieved relative to the use of pure oxygen as the gas medium in the adsorption zone. The vent gas mixture (column 2) was clearly superior to air (column 3) at the higher throughput levels, at 565 cumulative liters of feed and above.

TABLE II

| | Acetic Acid Removals | | | | | | | | | |
|---|---|---|---|---|---|---|---|---|---|---|
| Cumulative Feed, liters | 512 | | 524 | | 536 | | 565 | | 585 | |
| Sample | pH | HAc mg/l | pH | HAc mg/l | pH | HAc mg/l | pH | HAc mg/l | pH | HAc mg/l |
| Feed | 7.1 | 22 | 6.8 | 79 | 6.7 | 127 | 6.7 | 382 | 6.7 | 440 |
| Col. 1 Effluent water (Oxygen) | 7.7 | 1.0 | 7.5 | 1.3 | 7.5 | 0.5 | 7.7 | 110 | 7.5 | 153 |
| Col. 2 Effluent water | 7.0 | 0.7 | 6.5 | 0.6 | 6.3 | 2.0 | 6.7 | 174 | 6.6 | 211 |

TABLE II-continued

| | Acetic Acid Removals | | | | | | | | |
|---|---|---|---|---|---|---|---|---|---|
| Cumulative Feed, liters | 512 | | 524 | | 536 | | 565 | | 585 |
| Sample | pH | HAc mg/l | pH | HAc mg/l | pH | HAc mg/l | pH | HAc mg/l | pH | HAc mg/l |
| (vent gas mixture) Col. 3 Effluent water (air) | 7.4 | 4.0 | 7.0 | 0.9 | 6.8 | nil | 7.0 | 348 | 6.8 | 330 |

The data show that for the column through which the oxygen-containing vent gas mixture was passed (column 2), the pH of the effluent cocurrently flowed therethrough generally dropped slightly by up to 0.4 pH units across the adsorption zone. Such drop in attributable to the $CO_2$ content of the vent gas mixture. The moderate pH lowering effect of the vent gas mixture is believed to contribute significantly to the observed enhancement of acetic acid removal by adsorption and biooxidation, as compared to the adsorbent bed through which air is passed (column 3). In the general practice of the invention, the pH of the effluent containing residual biodegradeable organic contaminants which is passed to the adsorption zone should be in the range of from about 5.5 to 7.5, so as not to adversely effect the aerobic bacterial growth present in the adsorption zone. Where acidic organic contaminants are present in the effluent from the activated sludge zone, the pH of the effluent is desirably in the range of about 6 to 7, in order to provide a favorable pH environment for adsorption and biological assimilation of the acidic contaminants.

EXAMPLE III

A comparative performance evaluation was undertaken to assess the performance of an illustrative embodiment of the present invention against that of an oxygenation activated sludge and activated carbon adsorption treatment system wherein oxygen feed gas streams are separately introduced to the oxygenation and adsorption zones.

The illustrative system representing the present invention was of a general type as shown in FIG. 2 featuring multiple oxygenation chambers in the liquid storage enclosure, but with two identical liquid storage enclosures disposed in side-by-side relationship, each processing one-half of the influent wastewater flow to the system and discharging oxygenated liquor to a single clarifier. This system employed a single carbon column adsorbent vessel, downstream from the activated sludge secondary treatment unit, as the adsorption zone for the system. The separate oxygen gas feed, unintegrated system also had the same apparatus configuration, with the exception that the vent gas from the third oxygenation chamber was discharged to the atmosphere and a separate oxygen feed gas stream, of the same composition as that introduced to the first oxygenation zone in the activated sludge unit, was used to supply oxygen-containing gas to the adsorbent bed.

The above-described systems were designed with the constraint that the volumetric flow rate of the oxygen-containing gas entering the adsorber column must be at least 10% of the volumetric flow rate of effluent entering the column to ensure adequate vapor-liquid distribution. The adsorber column used Westvaco "Nuchar" 8 × 40 mesh as the adsorbent and was sized to process 1 bed volume of wastewater per hour at the wastewater flow rate conditions considered. In each system the effluent and the oxygen-containing gas enter the adsorber column at a temperature of 35° C and pressure of 15 psig. This effluent enters the column with a dissolved oxygen concentration of 5 mg/l and is saturated in $CO_2$ with respect to the vent gas discharged from the third and final stage of the oxygenation zone. In each system the purified liquid effluent water is withdrawn at the upper end of the adsorber column at a 50% saturation of oxygen with respect to the waste gas discharged from the column. These conditions are based on system operation such that the oxygen transferred from the gas phase to the liquid phase in the adsorption zone equals the oxygen consumed by aerobic biological growth therein.

In this evaluation, two distinct sets of process conditions were considered for each of the two comparison systems, as denoted hereinafter by "Case I" and "Case II". These process conditions, together with the system apparatus parameters for each case, are set forth in Table III below.

TABLE III

| Example III - Process Conditions and System Apparatus Parameters | | |
|---|---|---|
| Oxygenation System Design Basis | Case 1 | Case 2 |
| Feed wastewater flow, million gallons per day | 1.5 | 8.5 |
| Feed Wastewater $BOD_5$, mg/l | 4500 | 550 |
| Mixed liquor volatile suspended solids mg/l | 4500 | 4500 |
| Feed Gas Composition (by volume) | 98% $O_2$, 2% Ar | 98% $O_2$, 2% Ar |
| Feed Gas Pressure, inches $H_2O$ (gauge) | 2-5 | 2-5 |
| Feed Gas Flow Rate, lbs. $O_2$/hr | 3490 | 2240 |
| Vent Gas Composition (by volume) | 38% $O_2$, 54% $CO_2$, 2% Ar, 6% $H_2O$, 0% $N_2$ | 40% $O_2$, 45% $CO_2$, 5% Ar, 5% $H_2O$, 5% $N_2$ |
| Vent Gas Flow Rate, lb. moles/hr | 89.2 | 24.0 |
| Vent Gas Pressure, psia | 14.7 | 14.7 |
| Mixed Liquor D.O., mg/liter | 5 | 5 |
| Number of Stages in Oxygenation Zone* | 4 | 3 |
| Liquid Volume of each Stage in the Oxygenation Zone, gallons | 253,900 | 590,280 |
| Clarifier Cross-Sectional Area, Feet² | 2500 | 14,166 |
| STE of Gas-Liquid Contacting Devices in each Stage of Oxygenation Zone, lbs. $O_2$/Bhp-hr | 5.3 | 3.3 |
| Sludge Recycle Rate, % | 39 | 39 |
| Oxygenation zone retention time, hrs | 32.5 | 10.0 |
| Food to biomass ratio, lb $BOD_5$/lb MLVSS-day | 0.75 | 0.30 |
| Oxygen requiement, Lbs $O_2$/lb $BOD_5$ removed | 1.05 | 1.45 |
| Secondary effluent $BOD_5$, mg/l | 100 | 100 |
| Carbon Adsorption Zone Design Basis | | |
| Organic contaminant-depleted effluent water $BOD_5$, mg/l | 50 | 50 |
| Oxygen requirement, Lbs $O_2$/lb $BOD_5$ removed | 1.0 | 1.0 |
| Effluent water D.O., mg/l | 4 | 4 |
| Configuration | Vertical, upflow | co-current |
| Percent Oxygen in Waste Gas (by volume) | 22 | 29 |
| Waste Gas Flow Rate, lb. moles/hr | 4.6 | 17 |
| Waste Gas Pressures psia | 14.7 | 14.7 |
| Waste Gas Recycle Volumetric Flow Rate ft³hr. (at 95° F, 15 psig) | 0 | 616 |
| Suspended Solids in Effluent | | |

TABLE III-continued

Example III - Process Conditions and
System Apparatus Parameters

| Oxygenation System Design Basis | Case 1 | Case 2 |
|---|---|---|
| Flowed to Adsorption Zone | <100 ppm | <100 ppm |

*In both cases, there were two trains in the oxygenation zone, each with the tabulated number of stages therein In Case I, the two systems were evaluated for a high strength wastewater having a $BOD_5$ content of 4500 mg/l, such as is representative of typical chemical plant or refinery wastes. In Case II, the integrated (this invention) and unintegrated treatment systems were compared on the basis of a feed wastewater with 550 mg/l $BOD_5$, representative of a combined municipal/industrial wastewater.

The results of the evaluation are shown in Table IV below for both Case 1 and Case 2.

TABLE IV

| System Parameter | Case 1 | | Case 2 | | |
|---|---|---|---|---|---|
| | Integrated Carbon Adsorber | Unintegrated Carbon Absorber | Integrated Carbon Adsorber | | Unintegrated Carbon Adsorber |
| Oxygenation System $O_2$ Utilization (%) | 69.0 | 69.0 | 86.0 | 80.5 | 86.0 |
| Total System $O_2$ Utilization (%) | 69.7 | 69.2 | 92.6 | 86.7 | 86.7 |
| Oxygenation Zone Mixing and Fluid Recirculation Power Consumption, HP | 480 | 480 | 450 | 390 | 450 |
| Power Required to Compress Gas Flowing to Carbon Column, HP | 2.99 | 2.93 | 16.6 | 16.6 | 16.6 |

As shown by the data, the oxygen utilization in Case 1 in the oxygenation zone was designed to be the same in both the integrated system according to the present invention and in the unintegrated system. Under such conditions, the power required for mixing and fluid recirculation in the oxygenation zone were thus also the same. The overall oxygen utilizaton for the total system (activated sludge secondary treatment and activated carbon tertiary treatment) was however marginally higher for the integrated system of this invention relative to the unintegrated system. The importance of the data in Case 1 lies in the fact that even at the higher BOD levels of this Case, the vent gas discharged from the oxygenation zone contains an adequate amount of oxygen to carry out the required BOD removal in the adsorption zone. The power required to compress the gas flowed to the carbon column in the integrated systems is about 2% higher than in the unintegrated case owing to the smaller volume of gas in the latter case.

In Case 2, two sets of calculations were made for the integrated system to separately compare the integrated and unintegrated systems at equal oxygenation zone power consumption and again at equal overall oxygen utilization levels. The power required to compress the oxygen-containing gas flowed to the carbon column in all comparison systems was the same, 16.6 horsepower (HP). Comparing first the integrated and unintegrated systems at equal oxygen utilization and power consumption in the oxygenation zone, the data show the total system oxygen utilization for the integrated system to be approximately 7% higher (92.6% v. 86.7%) than for the unintegrated system. When the two Case 2 systems are operated to obtain the same total system oxygen utilization level (86.7%), the integrated system achieves an oxygenation system oxygen utilization in the activated sludge step of 86.0% of the oxygen introduced to the oxygenation zone in the feed gas. Such oxygen utilization value is 6.8% higher than the value of 80.5% for the integrated system, but to obtain such utilization value, as necessary to achieve the same overall $O_2$ utilization of 86.7%, the unintegrated system requires a power expenditure of 450 horsepower for mixing and fluid recirculation in the oxygenation zone whereas only 390 horsepower are required in the oxygenation zone integrated with the adsorption zone in the manner of this invention. Thus the integrated system of this invention is characterized by a power consumption in the oxygenation zone which is 15.2% less than that required in the unintegrated system. Such striking reduction in power requirement under the present invention is a consequence of the fact that the integrated system is able to operate at significantly higher oxygen partial pressure in the oxygenation zone. With such higher oxygen partial pressure, the mass transfer driving force for oxygen dissolution is consequently increased so that correspondingly less mixing power is required in the oxygenation zone to effect such dissolution, all while achieving the same overall oxygen utilization level as in the unintegrated system.

the significance of the Case 1 and Case 2 results when taken together, is based on the fact that in most wastewater treatment systems the feed wastewater flows are associated with frequent and often substantial variation in strength (BOD content) of the liquid to be treated and hence the oxygen requirements for BOD removal in the system. Thus, in a system treating a wastewater with a moderate BOD level which is however subject to peak or "shock" loadings of high BOD waste, the integrated arrangement of this invention is able to provide efficient tertiary removal of residual contaminants in the activated carbon adsorption zone without loss of the high levels of oxygen utilization necessary for economic operation of the wastewater treatment system. Furthermore, it is common practice to overdesign a treatment plant in deference to anticipated long-range BOD load increases. For example, a plant may go on-stream at half its design capacity, with the full (design) load not expected until a number of years later. Under such conditions the integrated arrangement of the present invention is able to provide efficient tertiary treatment residual BOD removal over the operating life of the treatment plant without major alteration of the treatment apparatus.

The maximal benefits under the present invention are realized when the residual organics in the oxygen activated sludge effluent (adsorber feed) are predominantly biodegradable. Removal of bio-refractory organics is also enhanced in the absorber to the extent that the biological activity continuously opens up adsorptive sites by destroying the adsorbed biodegradable organics. The removal of marginally degradable organics can be enhanced by providing sufficient effluent retention time for microbical adaption to occur during the period of exposure of the biological growths to the residual organic material.

The present invention allows operation of the oxygen activated sludge unit at a higher wastewater flow rate, with consequent capital savings from the smaller volume requirement for the oxygenation zone. The utilization of the off-gas in a downstream adsorber alternatively permits the operation of the upstream activated sludge unit with increased oxygen feed, thereby reducing the dissolution horsepower requirements, as shown in the above Example III.

The economic benefits occurring in the adsorption zone operated in accordance with the present invention relative to anaerobic and air-gassed zones include increased treatment efficiency in a given sized adsorbent bed and longer on-stream adsorbent bed life, resulting in reduced regeneration frequency, which in turn is associated with reduced regeneration furnace size (and investment) and reduced regeneration operating costs. Frequent regeneration is also undesirable for the reason that it entails greater carbon losses by attrition and burning (in the case of thermal regeneration) and higher costs for make-up carbon.

Although preferred embodiments have been described in detail, it will be further appreciated that other embodiments are contemplated only with modification of the disclosed features, as being within the scope of the invention.

What is claimed is:

1. In a method for treating wastewater containing biodegradeable organic contaminants by oxygenation in contact with active biomass including the steps of mixing the wastewater with activated sludge and feed gas containing at least 50% oxygen by volume in an enclosed oxygenation zone for sufficient duration to biochemically oxidize carbon food in the wastewater and form oxygenated liquor of reduced BOD content; discharging from the oxygenation zone oxygen-depleted vent gas containing 20–70% oxygen by volume, and the oxygenated liquor; and separating the oxygenated liquor into effluent containing residual biodegradeable organic contaminants and sludge, and recycling at least part of the latter to the oxygenation zone as the activated sludge therefor: the improvement of removing the residual organic contaminants from the effluent comprising: cocurrently flowing the effluent and at least part of the vent gas from said oxygenation zone upwardly through an activated carbon absorption zone with the vent gas being introduced at a rate sufficient to sustain aerobic biological conditions in the absorption bed and maintain a dissolved oxygen concentration of at least 2 p.p.m. in the effluent being flowed therethrough for physical absorption and biochemical oxidization of the residual organic contaminants in the absorption zone, and discharging organic contaminant depleted effluent water and oxygen depleted waste gas from the absorption zone.

2. A method according to claim 1 wherein the oxygen depleted vent gas discharged from the oxygenation zone contains 40–60% oxygen by volume.

3. A method according to claim 1 wherein the pH of the effluent containing residual biodegradeable organic contaminants is in the range of from about 5.5 to 8.0.

4. A method according to claim 1 wherein the pH of the effluent containing residual biodegradeable organic contaminants is in the range of from about 6 to 7.

5. A method according to claim 1 wherein one of the wastewater and feed gas fluids is simultaneously continuously recirculated against the other fluid during the mixing in the enclosed oxygenation zone.

6. A method according to claim 1 wherein the oxygenation zone comprises at least two stages with oxygen-containing gas and liquor being mixed in each stage and unconsumed oxygen containing gas being flowed to the next stage for additional mixing therein and with the oxygen-depleted vent gas and oxygenated liquor being discharged from the final mixing stage.

7. A method according to claim 1 wherein the oxygenation zone comprises at least two stages with oxygen-containing gas and liquor being mixed and one of the oxygen-containing gas and liquor fluids being simultaneously continuously recirculated against the other fluid in each stage and separately cocurrently flowed to the next stage for additional mixing and fluid recirculation therein and with the oxygen-depleted vent gas and oxygenated liquor being discharged from the final mixing stage.

8. A method according to claim 1 wherein the oxygenation zone comprises a first section wherein the wastewater, activated sludge and feed gas are mixed for only sufficient time for BOD absorption by biomass therein to form the oxygenated liquor; the oxygenated liquor is separated into the effluent and BOD-enriched sludge; unconsumed oxygen-containing gas is flowed from the oxygenation zone first section to a second section of the oxygenation zone and mixed therein with the BOD-enriched sludge for sufficient time for the sludge to assimilate the BOD and form the activated sludge.

9. A method according to claim 1 wherein the feed gas contains at least 80% oxygen by volume.

10. A method according to claim 1 wherein all of the vent gas from the oxygenation zone is passed to the activated carbon adsorption zone.

11. A method according to claim 1 wherein a portion of the oxygen-depleted waste gas discharged from the activated carbon absorption zone is recirculated and joined with the vent gas from the oxygenation zone flowed through the absorption zone to enhance removal of the organic contaminants therein.

12. A method according to claim 1 comprising the further steps of: sensing the dissolved oxygen concentration in the final effluent water discharged from the adsorbent vessel at its upper end; converting the dissolved oxygen concentration sensing into a transmittable signal; and adjusting the flow rate of the oxygen-depleted vent gas passed through the adsorbent bed by means of transmitted dissolved oxygen concentration signal to maintain a predetermined dissolved oxygen concentration in the effluent withdrawn therefrom.

13. In a method for treating wastewater containing biodegradeable organic contaminants by oxygenation in contact with active biomass including the steps of mixing the waste-water with activated sludge and feed gas containing at least 50% oxygen by volume in an enclosed oxygenation zone comprising at least two oxygenation stages in a first oxygenation stage and simultaneously continuously recirculating one of such fluids against the other fluids therein to form a first oxygenated liquor and first unconsumed oxygen-containing gas; transferring the first oxygenated liquor and first unconsumed oxygen-containing gas from the first stage to a second oxygenation stage; mixing the transferred first oxygenated liquor and first unconsumed oxygen-containing gas and simultaneously continuously recirculating one of such fluids against the other fluids in at least a second oxygenation stage to form at least a second oxygenated liquor and second unconsumed oxygen-containing gas of lower oxygen purity than the first unconsumed oxygen-containing gas; discharging from the final oxygenation stage oxygen-depleted vent gas containing 20–70% oxygen by volume, and oxygenated liquor; and separating the oxygenated liquor into effluent containing residual biodegradeable organic contaminants and sludge, and recycling at least part of the latter to the oxygenation zone as the activated sludge therefor; the improvement of removing the residual organic contaminants from the effluent comprising: cocurrently flowing the effluent and at least part of the vent gas from said oxygenation zone upwardly through an activated carbon absorption zone with the vent gas being introduced at a rate sufficient to sustain aerobic biological conditions in the absorption bed and maintain a dissolved oxygen concentration of at least 2 p.p.m. in the effluent being flowed therethrough for physical absorption and biochemical oxidization of said residual organic contaminants in said absorption zone, and discharging organic contaminants depleted effluent water and oxygen-depleted waste gas from said absorption zone.

14. In an apparatus for treating wastewater containing biodegradeable organic contaminants by oxygenation in contact with active biomass including; an enclosed oxygenation vessel means for introducing wastewater and activated sludge to the oxygenation vessel conduit means for introducing at least 50% oxygen by volume feed gas at superatmospheric pressure to the vessel; gas-liquid contacting means positioned within the vessel for mixing the wastewater, activated sludge and oxygen-containing gas therein to form oxygenated liquor; gas vent means for discharging oxygen-depleted vent gas from the vessel; passage means for transferring oxygenated liquor from the oxygenation vessel to means for separating the oxygenated liquor into effluent containing residual biodegradeable organic contaminants and activated sludge; means for recycling the separated sludge from the separating means to the means for introducing activated sludge to the oxygenation vessel; and means for discharging effluent containing residual biodegradeable organic contaminants from the separating means; the improvement of means for removing the residual organic components from the effluent comprising: an adsorbent vessel with enclosing side and bottom walls containing a bed of particulate activated carbon adsorbent bearing against the side walls thereof, and bed being supported within the adsorbent vessel at its lower end and unconfined an its upper end; means joined to the gas bent means for introducing the oxygen-depleted vent gas discharged from the oxygenation vessel into the adsorbent vessel at its lower end; means joined to effluent discharge means for introducing the effluent containing residual biodegradeable organic contaminants into the adsorbent vessel at its lower end; and means for discharging oxygen-depleted waste gas and final effluent water from the adsorbent vessel at its upper end, to provide cocurrent upward flow of the introduced oxygen-depleted vent gas and effluent through the adsorbent bed and maintain aerobic biological conditions therein for physical adsorption and biochemical oxidization of the residual organic contaminants in the effluent flowed therethrough.

15. Apparatus according to claim 14 wherein the gas-liquid contacting means provide continuous recirculation of one of the liquor and oxygen-containing gas fluids against the other fluids in the oxygenation vessel simultaneously with the mixing therein.

16. Apparatus according to claim 14 wherein the enclosed oxygenation vessel comprises a wastewater liquid storage enclosure, with at least two separate oxygenation chambers within the storage enclosure each having walls extending substantially to the floor of the storage enclosure and also extending above the BOD-containing liquid level, and covers over the upper ends of the chamber walls to form gas spaces; the feed gas conduit means and the wastewater and activated sludge introduction means disposed to introduce the feed gas, wastewater and activated sludge to a first oxygenation chamber; first gas-liquid contacting means positioned within the first oxygenation chamber for mixing and simultaneously continuously recirculating one of the wastewater and oxygen-containing gas fluids against the other fluids therein to form first oxygenated liquor and first unconsumed oxygen containing gas; restricted passageway means for flow of the first unconsumed oxygen-containing gas from the gas space of the first oxygenation chamber to a second oxygenation chamber; restricted flow means for transferring the first oxygenated liquor to the second oxygenation chamber; second gas-liquid contacting means positioned within the second oxygenation chamber for mixing and simultaneously continuously recirculating one of the liquor and oxygen-containing gas fluids against the other fluids therein to form second oxygenated liquor and second unconsumed oxygen-containing gas; and the gas vent discharge means and the oxygenated liquor transfer passage means disposed to separately discharge the oxygen-depleted vent gas and transfer the oxygenated liquor from a final oxygenation chamber.

17. Apparatus according to claim 14 further comprising gas recycle conduit means joining the means for discharging oxygen-depleted waste gas from the adsorbent vessel at its upper end with the means for introducing the oxygen-depleted vent gas discharged from the oxygenation vessel into the adsorbent vessel at its lower end, for recirculation of a portion of the oxygen-depleted waste gas and joining thereof with the vent gas flowed through the adsorbent bed, to enhance removal of the organic contaminants therein.

18. Apparatus according to claim 14 wherein the gas-liquid contacting means have a standard air transfer efficiency of at least 1.5 lbs. oxygen/horsepower-hour.

19. Apparatus according to claim 14 further comprising flow control means for regulating the proportion of discharged oxygen-depleted vent gas introduced into the adsorbent vessel; means for sensing the dissolved oxygen concentration in the final effluent water discharged from the adsorbent vessel at its upper end, and means for transmitting signals from the dissolved oxygen concentration sensing means to the flow control means for adjustment of the flow rate of oxygen-depleted vent gas passed through the adsorbent bed to maintain a predetermined dissolved oxygen concentration in the effluent withdrawn therefrom.

20. In an apparatus for treating wastewater containing biodegradeable organic contaminants by oxygenation in contact with active biomass including: an enclosed oxygenation vessel; means for introducing wastewater and activated sludge to the oxygenation vessel; conduit means for introducing at least 50% oxygen by volume feed gas at superatmospheric pressure to the vessel; gas-liquid contacting means positioned within the vessel for mixing wastewater, activated sludge and oxygen-containing gas therein to form oxygenated liquor; gas vent means for discharging oxygen-depleted vent gas from the vessel; passage means for transferring oxygenated liquor from the oxygenation vessel to means for separating the oxygenated liquor into effluent containing residual biodegradeable organic contaminants and activated sludge; means for recycling the separated sludge from the separating means to the means for introducing activated sludge to the oxygenation vessel; and means for discharging effluent containing residual biodegradeable organic contaminants from the separating means; the improvement of means for removing the residual organic components from the effluent comprising: at least two adsorbent vessels arranged in series relationship each with enclosing side and bottom walls containing a bed of particulate activated carbon adsorbent bearing against the side walls thereof, each bed being supported within the vessel at its lower end and unconfined at its upper end; means joined to the gas vent means for introducing the oxygen-depleted vent gas discharged from the oxygenation vessel into each of the vessels at its lower end; means joined to effluent discharge means for introducing the effluent containing residual biodegradeable organic contaminants into a first adsorbent vessel at its lower end; means for separately discharging first oxygen-depleted waste gas and first effluent water from the first adsorbent vessel at its upper end, to provide cocurrent upward flow of the introduced oxygen-depleted vent gas and effluent water through the first adsorbent bed and maintain aerobic bacteriological conditions therein for physical adsorption and biochemical oxidization of the residual organic contaminants in the effluent flowed therethrough; intervessel conduit means joined to the first effluent water discharge means for transferring the first effluent water from the first adsorbent vessel into a second adsorbent vessel at its lower end; and means for separately discharging second oxygen-depleted waste gas and second effluent water from the second adsorbent vessel at its upper end, to provide cocurrent upward flow of the introduced first oxygen-depleted vent gas and first effluent water through the second adsorbent bed and maintain aerobic biological conditions therein for physical adsorption and biochemical oxidization of the residual organic contaminants in the effluent flowed therethrough.

21. In an apparatus for treating wastewater containing biodegradeable organic contaminants by oxygenation in contact with active biomass including; a wastewater liquid storage enclosure; at least two separate oxygenation chambers within the storage enclosure each having walls extending substantially to the floor of the storage enclosure and also extending above the BOD-containing liquid level, and covers over the upper ends of the chamber walls to form gas spaces; means for introducing wastewater and activated sludge to a first oxygenation chamber; conduit means for introducing at least 50% oxygen by volume feed gas at super-atmospheric pressure to the first oxygenation chamber, first gas-liquid contacting means positioned within the first oxygenation chamber for mixing and continuously recirculating one of the wastewater and oxygen-containing gas fluids against the other fluids therein to form first oxygenated liquor and first unconsumed oxygen containing gas; restricted passageway means for flow of the first unconsumed oxygen-containing gas from the gas space of the first oxygenation chamber to a second oxygenation chamber; restricted flow means for transferring the first oxygenated liquor to the second oxygenation chamber; second gas-liquid contacting means positioned within the second oxygenation chamber for mixing and simultaneously continuously recirculating one of the liquor and oxygen-containing gas fluids against the other fluids therein to form second oxygenated liquor and second unconsumed oxygen-containing gas of lower oxygen purity than the first unconsumed oxygen-containing gas; gas vent means for discharging oxygen-depleted vent gas containing 20–70% oxygen by volume from a final oxygenation chamber; passage means for transferring oxygenated liquor from the final oxygenation chamber to means for separating the oxygenated liquor into effluent containing residual biodegradeable organic contaminants and activated sludge; means for recycling the separated sludge from the separating means to the means for introducing activated sludge to the first oxygenation chamber; and means for discharging effluent containing residual biodegradeable organic contaminants from the separating means; the improvement of means for removing the residual organic components from the effluent comprising: an adsorbent vessel with enclosing side and bottom walls containing a bed of particulate activated carbon adsorbent bearing against the side walls thereof, the bed being supported within the adsorbent vessel at its lower end and unconfined at its upper end; means joined to the gas vent means for introducing the oxygen-depleted vent gas discharged from the oxygenation vessel into the adsorbent vessel at its lower end; means joined to effluent discharge means for introducing the effluent containing residual biodegradeable organic contaminants into the adsorbent vessel at its lower end; and means for discharging oxygen-depleted waste gas and final effluent water from the adsorbent vessel at its upper end, to provide cocurrent upward flow of the introduced oxygen-depleted vent gas and effluent through the adsorbent bed and maintain aerobic biological conditions therein for physical adsorption and biochemical oxidization of the residual organic contaminants in the effluent flowed therethrough.

* * * * *